US012674105B2

(12) United States Patent
Nakajima et al.

(10) Patent No.: US 12,674,105 B2
(45) Date of Patent: Jul. 7, 2026

(54) FUEL PRODUCTION SYSTEM

(71) Applicant: HONDA MOTOR CO., LTD., Tokyo (JP)

(72) Inventors: Shiori Nakajima, Saitama (JP); Kota Okamura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/885,760

(22) Filed: Sep. 16, 2024

(65) Prior Publication Data

US 2025/0109345 A1 Apr. 3, 2025

(30) Foreign Application Priority Data

Oct. 2, 2023 (JP) ................................ 2023-171620

(51) Int. Cl.
*C10J 3/72* (2006.01)
*B01J 6/00* (2006.01)
(Continued)

(52) U.S. Cl.
CPC ............... *C10J 3/723* (2013.01); *B01J 6/008* (2013.01); *B01J 19/0013* (2013.01);
(Continued)

(58) Field of Classification Search
CPC ........ C10J 2300/0906; C10J 2300/0909; C10J 2300/0916; C10J 2300/0946;
(Continued)

(56) References Cited

U.S. PATENT DOCUMENTS

2021/0215095 A1* 7/2021 Hirokane ................ F02B 43/08
2021/0292664 A1* 9/2021 Chishima .................. C25B 1/04
(Continued)

FOREIGN PATENT DOCUMENTS

JP 2021147504 A * 9/2021 ............... C10K 1/08
JP 2021147506 A 9/2021
JP 7150099 B1 * 10/2022 ........... C07C 29/152

*Primary Examiner* — Latosha Hines
(74) *Attorney, Agent, or Firm* — CKC & Partners Co., LLC

(57) ABSTRACT

The fuel production system includes a $CH_4$ recoverer, an electrolyzer, a liquid fuel producer, a steam reformer that performs steam reforming of the methane and produces hydrogen, and a controller. The controller includes: a heat amount determiner that determines whether or not an amount of heat required to increase a temperature in the gasification furnace to a temperature required to gasify the biomass feedstock is less than a predetermined threshold; a $H_2$ production rate determiner that determines whether or not a production rate of hydrogen produced by the electrolyzer is equal to or greater than a predetermined threshold; and a steam reforming controller that controls the steam reformer to perform the steam reforming, and introduces the hydrogen produced, into the gasification furnace, in a case where the heat amount determiner determines that the required amount of heat for the gasification furnace is less than the predetermined threshold, and the $H_2$ production rate determiner determines that the production rate of hydrogen is less than the predetermined threshold.

4 Claims, 6 Drawing Sheets

(51) Int. Cl.

| | |
|---|---|
| ***B01J 19/00*** | (2006.01) |
| ***B01J 19/24*** | (2006.01) |
| ***C01B 3/34*** | (2006.01) |
| ***C25B 15/025*** | (2021.01) |
| ***C25B 15/08*** | (2006.01) |

(52) U.S. Cl.
CPC ............... *B01J 19/245* (2013.01); *C01B 3/34* (2013.01); *C25B 15/025* (2021.01); *C25B 15/081* (2021.01); *B01J 2219/00157* (2013.01); *B01J 2219/00191* (2013.01); *C01B 2203/0233* (2013.01); *C01B 2203/0238* (2013.01); *C01B 2203/1241* (2013.01); *C01B 2203/141* (2013.01); *C01B 2203/1657* (2013.01); *C01B 2203/1685* (2013.01); *C10J 2300/0916* (2013.01); *C10J 2300/1807* (2013.01); *C10J 2300/1853* (2013.01)

(58) Field of Classification Search
CPC ........ C10J 2300/0959; C10J 2300/0976; C10J 2300/1659; C10J 2300/1665; C10J 2300/1684; C10J 2300/1807; C10J 2300/1853; C10J 3/723; C25B 1/04; C25B 15/025; C25B 15/081; B01J 19/0013; B01J 19/245; B01J 2219/00157; B01J 2219/00191; B01J 6/008; C01B 2203/0233; C01B 2203/0238; C01B 2203/1241; C01B 2203/141; C01B 2203/1657; C01B 2203/1685; C01B 3/34
See application file for complete search history.

(56) References Cited

U.S. PATENT DOCUMENTS

2021/0292665 A1* 9/2021 Chishima ................ C25B 15/08
2022/0403536 A1* 12/2022 Chishima ................... C10J 3/00

* cited by examiner

FUEL PRODUCTION SYSTEM

This application is based on and claims the benefit of priority from Japanese Patent Application No. 2023-171620, filed on 2 Oct. 2023, the content of which is incorporated herein by reference.

BACKGROUND OF THE INVENTION

Field of the Invention

The present invention relates to a fuel production system. In more detail, the present invention relates to a fuel production system that produces a liquid fuel using biomass feedstock and renewable energy.

Related Art

Conventionally, electrosynthetic fuels have attracted attention as alternatives to fossil fuels. Such electrosynthetic fuels are produced from materials including hydrogen produced with electric power generated using renewable energy; and carbon sources, such as biomass or carbon dioxide, discharged from factories.

A common process for producing a liquid fuel, such as methanol or gasoline, using biomass as feedstock is as follows. The liquid fuel is produced from the biomass feedstock through a gasification step of gasifying biomass feedstock that has been subjected to a predetermined pre-process, together with water and oxygen, in a gasification furnace to produce a syngas containing hydrogen and carbon monoxide; a cleaning step of cleaning the produced syngas and removing tar; an $H_2$/CO ratio adjusting step of adjusting the $H_2$/CO ratio of the syngas that has been subjected to the cleaning step, to a target ratio depending on the liquid fuel to be produced; a desulfurization step of removing sulfur components from the syngas that has been subjected to the $H_2$/CO ratio adjusting step; and a fuel production step of producing a liquid fuel from the syngas the has been subjected to the desulfurization step.

Here, the $H_2$/CO ratio of the syngas produced through the gasification step often fails to reach the target ratio, and is in a hydrogen deficient state. Patent Documents 1 and 2 describe techniques that adjust the $H_2$/CO ratio of a syngas discharged from a gasification furnace by supplying hydrogen produced by an electrolyzer that produces hydrogen from water using renewable energy, into the gasification furnace or a biomass feedstock supply channel. According to the techniques described in Patent Documents 1 and 2, the amount of carbon dioxide generated in the entire fuel production system can be reduced.

Patent Document 1: Japanese Unexamined Patent Application, Publication No. 2021-147504

Patent Document 2: Japanese Unexamined Patent Application, Publication No. 2021-147506

SUMMARY OF THE INVENTION

Meanwhile, externally introducing hydrogen when biomass feedstock is gasified results in that, for example, the amount of methane generated as a byproduct during the gasification tends to increase. There is room for improvement in view of efficiently utilizing components, such as byproducts generated in the gasification step.

The present invention has an object to provide a fuel production system that can facilitate improvement in efficiency throughout the entire system.

(1) A fuel production system for producing a liquid fuel from biomass feedstock includes: a gasification furnace that gasifies biomass feedstock to produce a syngas containing hydrogen and carbon monoxide; a methane recoverer that recovers methane generated as a byproduct in the gasification furnace; an electrolyzer that produces hydrogen with electric power generated using renewable energy; a liquid fuel producer that produces a liquid fuel from the syngas produced in the gasification furnace; a steam reformer that performs steam reforming of the methane recovered by the methane recoverer to produce hydrogen; and a controller that controls the methane recoverer and the steam reformer. The controller includes: a heat amount determiner that determines whether or not an amount of heat required to increase a temperature in the gasification furnace to a temperature required to gasify the biomass feedstock is less than a predetermined threshold; a hydrogen production rate determiner that determines whether or not a production rate of hydrogen produced by the electrolyzer is equal to or greater than a predetermined threshold; and a steam reforming controller that controls the steam reformer to perform the steam reforming, and introduces the hydrogen produced, into the gasification furnace, in a case where the heat amount determiner determines that the amount of heat required is less than the predetermined threshold, and the hydrogen production rate determiner determines that the production rate of hydrogen is less than the predetermined threshold.

(2) The fuel production system according to (1) further includes: a carbon dioxide recoverer that recovers carbon dioxide generated when the syngas is produced in the gasification furnace; a carbon dioxide tank that stores the carbon dioxide recovered by the carbon dioxide recoverer; and a dry-reformer that performs dry reforming of the methane, and produces hydrogen and carbon monoxide. The controller further includes: a carbon dioxide amount determiner that determines whether or not a storage amount of the carbon dioxide in the carbon dioxide tank is equal to or greater than a predetermined threshold; and a dry-reforming controller that controls the dry-reformer to perform the dry reforming, and introduces the hydrogen and carbon monoxide produced, toward the liquid fuel producer, into a syngas discharging region where the syngas is discharged from the gasification furnace in a case where the heat amount determiner determines that the amount of heat required is less than the predetermined threshold, the hydrogen production rate determiner determines that the production rate of hydrogen is equal to or greater than the predetermined threshold, and the carbon dioxide amount determiner determines that the storage amount of the carbon dioxide is equal to or greater than the predetermined threshold.

(3) In the fuel production system according to (1) or (2), the controller further includes a heating controller that uses the methane recovered by the methane recoverer as a heat source for the gasification furnace, in a case where the heat amount determiner determines that the amount of heat required is equal to or greater than the predetermined threshold.

The present invention can facilitate improvement in efficiency throughout the entire system.

DETAILED DESCRIPTION OF THE INVENTION

Hereinafter, a fuel production system according to an embodiment of the present invention is described with reference to the drawings.

Figure 1:
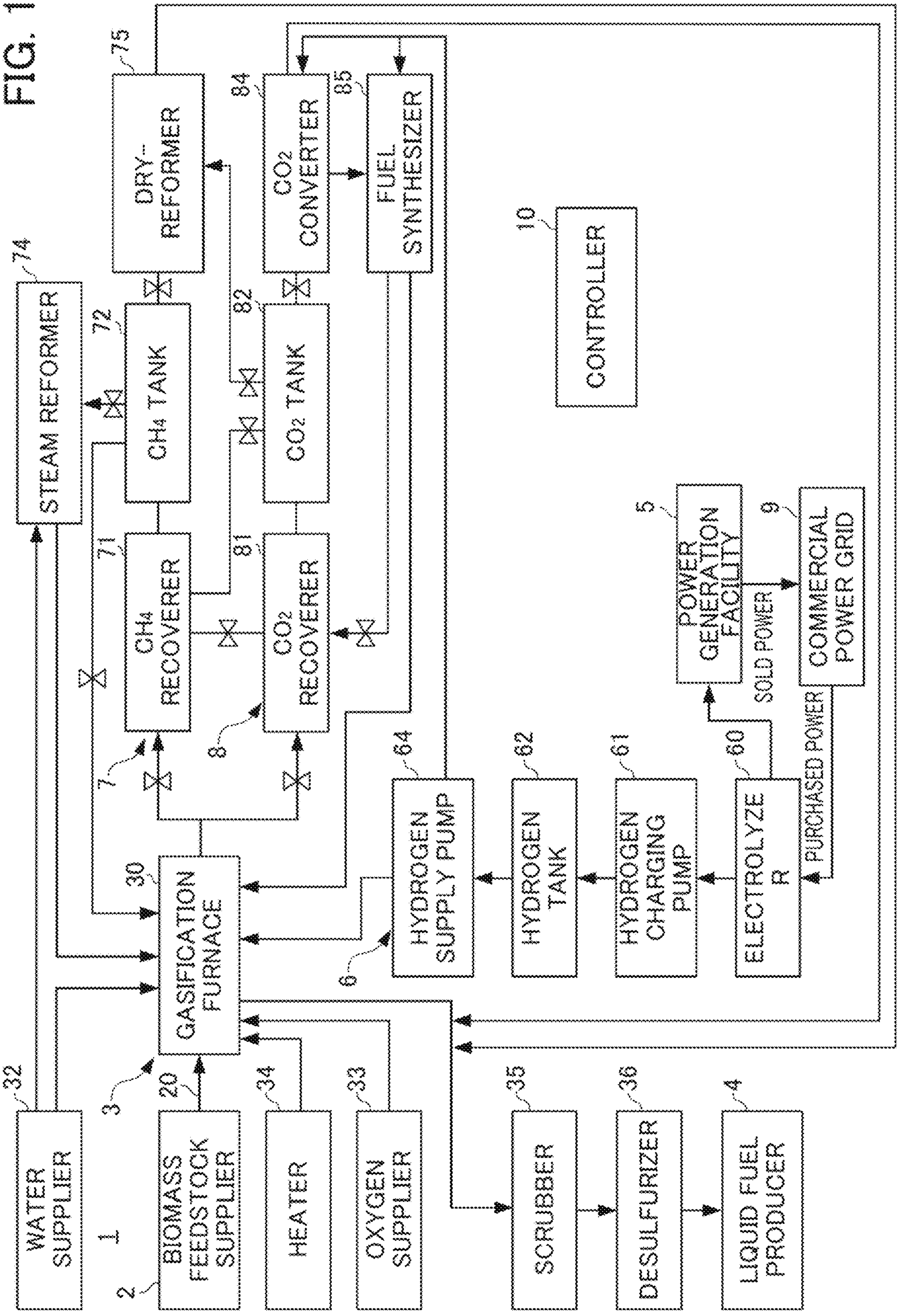
FIG. 1 shows a configuration of a fuel production system according to one embodiment of the present invention.
Figure 2:
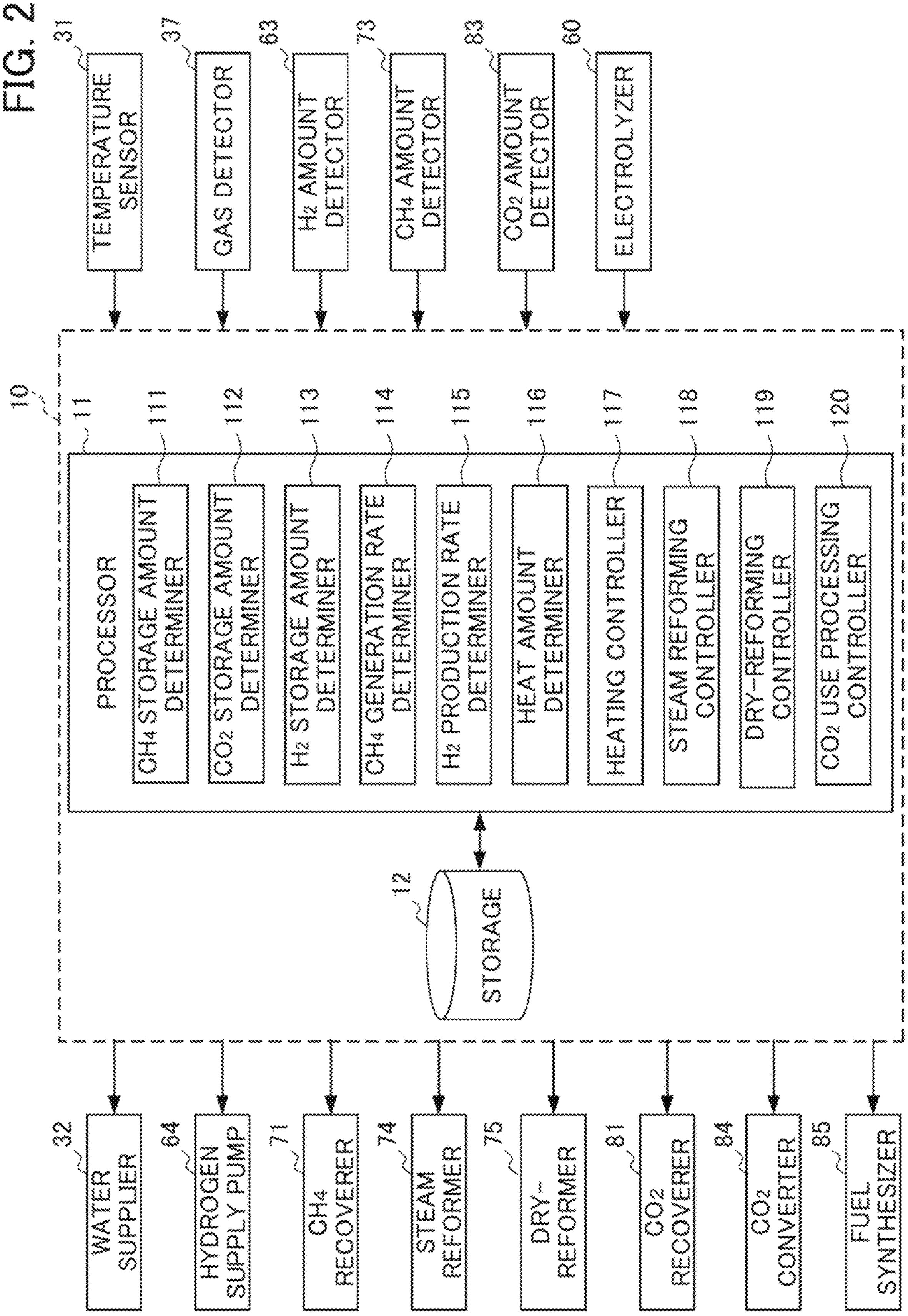
FIG. 2 is a block diagram showing a configuration of hardware including a controller, and a functional configuration of the controller, the controller executing a methane using process, and a carbon dioxide using process in a fuel production system according to one embodiment of the present invention.

FIG. 1 shows the configuration of the fuel production system 1 according to this embodiment. FIG. 2 is a block diagram showing a configuration of hardware including a controller 10, and a functional configuration of the controller 10, the controller 10 executing a methane using process, and a carbon dioxide using process in a fuel production system 1. The fuel production system 1 includes: a biomass feedstock supplier 2 that supplies biomass feedstock; a gasifier 3 that gasifies biomass feedstock supplied from the biomass feedstock supplier 2, and produces a syngas that contains hydrogen, and carbon monoxide; a liquid fuel producer 4 that produces a liquid fuel from the syngas supplied from the gasifier 3; a power generation facility that generates electric power using renewable energy; a hydrogen producer and supplier 6 that produces hydrogen from water using electric power generated by the power generation facility 5, and supplies the produced hydrogen to the gasifier 3; a methane using processor 7 that recovers methane generated as a byproduct during gasification of the biomass feedstock by the gasifier 3; a carbon dioxide using processor 8 that recovers and uses carbon dioxide generated during gasification of the biomass feedstock; and a controller 10 that controls the gasifier 3, the power generation facility 5, the hydrogen producer and supplier 6, the methane using processor 7, and the carbon dioxide using processor 8. This system produces the liquid fuel from the biomass feedstock through them.

The biomass feedstock supplier 2 applies a predetermined pretreatment to biomass feedstock, such as rice hulls, bagasse, and wood, and supplies the biomass feedstock that has been subjected to this pretreatment to a gasification furnace 30 of the gasifier 3 through a feedstock supply channel 20. The pretreatment applied to the biomass feedstock includes, for example, a drying step of drying the feedstock, and a pulverization step of pulverizing the feedstock.

The gasifier 3 includes: the gasification furnace 30 that gasifies biomass feedstock supplied through the feedstock supply channel 20; a pressure sensor (not shown) that detects the pressure in the gasification furnace 30; a temperature sensor 31; a gas detector 37; a water supplier 32 that supplies water into the gasification furnace 30; an oxygen supplier 33 that supplies oxygen or air into the gasification furnace 30; a heater 34 that heats the gasification furnace 30; a scrubber 35 that cleans a syngas discharged from the gasification furnace 30; and a desulfurizer 36 that removes sulfur components from the syngas cleaned by the scrubber 35, and supplies the cleaned syngas to the liquid fuel producer 4.

The water supplier 32 supplies water stored in a water tank, not shown, into the gasification furnace 30. The oxygen supplier 33 supplies oxygen stored in an oxygen tank, not shown, into the gasification furnace 30. The heater 34 heats the gasification furnace 30 by consuming a fuel supplied from a fuel tank, not shown, and electric power supplied from a power source, not shown. The supply rate of water from the water supplier 32 into the gasification furnace 30, the supply rate of oxygen from the oxygen supplier 33 into the gasification furnace 30, and the input heat rate from the heater 34 into the gasification furnace 30 can be controlled by the controller 10. Note that in the fuel production system 1 according to this embodiment, the supply of hydrogen from the after-mentioned hydrogen producer and supplier 6 into the gasification furnace 30 or the feedstock supply channel 20 will sometimes eliminate the need to actively supply water from the water supplier 32 into the gasification furnace 30. In this case, the water supplier 32 may be omitted from the fuel production system 1.

When the water supplier 32, the oxygen supplier 33, and the heater 34 respectively introduce water, oxygen, heat and the like into the gasification furnace 30 where the biomass feedstock has been introduced, various types of forward gasification reactions and their reverse reactions, such as e.g., those represented by formulas (1-1) to (1-5), proceed in the gasification furnace 30, and a syngas that contains hydrogen and carbon monoxide is produced.

[Chem. 1]

$$C + H_2O \rightleftharpoons CO + H_2 \quad (1\text{-}1)$$

$$C + CO_2 \rightleftharpoons 2CO \quad (1\text{-}2)$$

$$C + 2H_2 \rightleftharpoons CH_4 \quad (1\text{-}3)$$

$$CO + H_2O \rightleftharpoons CO_2 + H_2 \quad (1\text{-}4)$$

-continued $$CH_4 + H_2O \rightleftharpoons CO + 3H_2 \quad (1\text{-}5)$$

$$CO_2 + 4H_2 \rightleftharpoons CH_4 + 2H_2O \quad (1\text{-}8)$$

The temperature sensor 31 detects the temperature in the gasification furnace 30. The temperature sensor 31 in this embodiment detects, for example, the temperature in a reaction tube, in which a reaction of gasifying the biomass feedstock occurs, in the gasification furnace 30. Information about the temperature detected by the temperature sensor 31 is transmitted to the controller 10.

The gas detector 37 detects information about a syngas produced in the gasification furnace 30. The information about the syngas includes, for example, the flow rate of the syngas, the amount or rate, and concentration of each component in the gasification furnace 30. The gas detector 37 may include, for example, a plurality of sensors. The plurality of sensors may include, for example, an $H_2$/CO sensor that detects the $H_2$/CO ratio corresponding to the ratio between the hydrogen and carbon monoxide in the syngas, a $CO_2$ sensor that detects carbon dioxide in the gasification furnace 30, a $CH_4$ sensor that detects methane in the gasification furnace 30, and a $H_2$ sensor that detects hydrogen in the gasification furnace 30. For example, the gas detector 37 is disposed around the outlet of the gasification furnace 30, and may be configured to include a measurement instrument, such as of gas chromatography, which measures the rates or amounts of specific gases, such as hydrogen, methane, carbon monoxide, and carbon dioxide, contained in the syngas produced in the gasification furnace 30. Detection signals and information detected by these sensors and measurement instrument, which constitute the gas detector 37, are transmitted to the controller 10.

The gasifier 3 mixes the syngas produced by the gasification reactions and their reverse reactions represented by the formulas (1-1) to (1-5) described above with hydrogen supplied from the hydrogen producer and supplier 6 described later to thereby adjust the $H_2$/CO ratio of the syngas to a predetermined target ratio (e.g., a target $H_2$/CO ratio of two when methanol is produced) depending on the liquid fuel to be produced, and subsequently supplies this syngas to the liquid fuel producer 4.

The liquid fuel producer 4 includes a methanol synthesizer, a methanol-to-gasoline (MTG) synthesizer, a Fischer-Tropsch (FT) synthesizer, and an upgrader, and uses them to produce a liquid fuel, such as methanol or gasoline, from the syngas with the $H_2$/CO ratio adjusted to a predetermined $H_2$/CO ratio in the gasifier 3.

The power generation facility 5 includes a wind power generation facility that generates electricity by wind power as renewable energy, and a solar power generation facility that generates electricity from sunlight as renewable energy. The power generation facility 5 is connected to the hydrogen producer and supplier 6. The power generated by the wind power generation facility, the solar power generation facility or the like using renewable energy can be supplied to the hydrogen producer and supplier 6. The power generation facility 5 is also connected to a commercial power grid 9. Thus, part or all of the power generated by the power generation facility 5 can be supplied to the commercial power grid 9, and sold to an electric power company.

The hydrogen producer and supplier 6 includes an electrolyzer 60, a hydrogen charging pump 61, an $H_2$ tank 62, an $H_2$ amount detector 63, and a hydrogen supply pump 64, uses them to produce hydrogen using the electric power supplied from the power generation facility 5 and then to supply the produced hydrogen to the gasifier 3.

The electrolyzer 60 is connected to the power generation facility 5, and produces hydrogen and oxygen from water by electrolysis using the electric power supplied from the power generation facility 5. The electrolyzer 60 is also connected to the commercial power grid 9. Thus, the electrolyzer 60 can produce hydrogen and oxygen using not only the electric power supplied from the power generation facility 5 but also the electric power supplied through the commercial power grid 9, which is purchased from the power company. The hydrogen production rate and the oxygen production rate by the electrolyzer 60 are controlled by the controller 10.

The hydrogen charging pump 61 compresses the hydrogen produced by the electrolyzer 60, and charges the $H_2$ tank 62 with the produced hydrogen. The amount of hydrogen charged by the hydrogen charging pump 61 is controlled by the controller 10. The $H_2$ tank 62 stores the hydrogen compressed by the hydrogen charging pump 61. The $H_2$ amount detector 63 detects the amount of hydrogen stored in the $H_2$ tank 62. The $H_2$ amount detector 63 may be, for example, a pressure sensor that detects the internal pressure in the $H_2$ tank 62. The $H_2$ amount detector 63 detects the tank internal pressure of the $H_2$ tank 62, and transmits the detection signal to the controller 10. The amount of hydrogen in the $H_2$ tank 62 is calculated by the controller 10, based on the detection signal of the $H_2$ amount detector 63.

The hydrogen supply pump 64 supplies the hydrogen stored in the $H_2$ tank 62 into the gasification furnace 30 of the gasifier 3. The hydrogen supply rate from the hydrogen supply pump 64 to the gasification furnace 30 is controlled by the controller 10. Note that FIG. 1 illustrates a case of supplying the hydrogen stored in the $H_2$ tank 62 into the gasification furnace 30 by the hydrogen supply pump 64. However, the present invention is not limited thereto. The hydrogen stored in the $H_2$ tank 62 may be supplied upstream of the gasification furnace 30, more specifically, supplied into the biomass feedstock supply channel 20. The hydrogen supply pump 64 supplies hydrogen also to the carbon dioxide using processor 8 in a carbon dioxide using process described later.

The methane using processor 7 includes a $CH_4$ recoverer (methane recoverer) 71, a $CH_4$ tank 72, a $CH_4$ amount detector 73, a steam reformer 74, and a dry-reformer 75.

The $CH_4$ recoverer 71 includes a gas separation membrane, and recovers methane generated as a byproduct in the gasification furnace 30. Specifically, the $CH_4$ recoverer 71 recovers methane by passing the syngas supplied from the gasification furnace 30, through the gas separation membrane, and separating methane contained in the syngas from the other components, such as carbon dioxide. The methane separated from the syngas by the $CH_4$ recoverer 71 is sent to the $CH_4$ tank 72. On the other hand, the other components containing carbon dioxide are sent to a $CO_2$ recoverer (carbon dioxide recoverer) 81 or a $CO_2$ tank 82, which are described later. Note that the $CH_4$ recoverer 71 is controlled by the controller 10, and recovers the methane generated as a byproduct in the gasification furnace 30 if a predetermined condition described later is satisfied.

The $CH_4$ tank 72 stores the methane recovered by the $CH_4$ recoverer 71. The $CH_4$ amount detector 73 detects the amount of methane stored in the $CH_4$ tank 72. The $CH_4$ amount detector 73 may be, for example, a pressure sensor that detects the internal pressure in the $CH_4$ tank 72. The $CH_4$ amount detector 73 detects the internal pressure in the $CH_4$ tank 72, and transmits the detection signal to the controller 10. The amount of methane in the $CH_4$ tank 72 is calculated by the controller 10, based on the detection signal of the $CH_4$ amount detector 73.

The steam reformer 74 reforms the methane with steam, and produces hydrogen and carbon monoxide. In the steam reformer 74, steam reforming is performed at, for example, a pressure of 1 MPa or less, and a temperature of 800° C., and a reaction as indicated by the following formula (2) proceeds. As indicated by the following formula (2), by steam reforming of one mole of methane, three moles of hydrogen, and one mole of carbon monoxide can be produced. The produced hydrogen and carbon monoxide are introduced from the steam reformer 74 into the gasification furnace 30. At this time, hydrogen and carbon monoxide may be directly introduced from the steam reformer 74 into the gasification furnace 30, or be introduced upstream of the gasification furnace 30, more specifically, into the gasification furnace 30 through the feedstock supply channel 20. Thus, a gas containing three moles of hydrogen per mole of carbon monoxide is introduced from the steam reformer 74 into the gasification furnace 30. Accordingly, the hydrogen concentration in the gasification furnace 30 can be increased. Note that the steam reformer 74 is controlled by the controller 10 to produce hydrogen and carbon monoxide by steam reforming from methane supplied from the $CH_4$ tank 72 if a predetermined condition described later is satisfied.

[Chem. 2]

$$CH_4 + H_2O \rightleftharpoons CO + 3H_2 \quad (2)$$

The dry-reformer 75 performs dry reforming of methane, and produces hydrogen and carbon monoxide. In the dry-reformer 75, dry reforming is performed using methane supplied from the $CH_4$ tank 72, carbon dioxide supplied from the carbon dioxide using processor 8, a predetermined catalyst and the like, and a reaction as indicated by the following formula (3) proceeds. As indicated by the following formula (3), dry reforming of one mole of methane can produce two moles of hydrogen, and two moles of carbon monoxide. For example, the produced hydrogen and carbon monoxide are introduced into a syngas discharging region where the syngas is discharged from the gasification furnace 30 toward the liquid fuel producer 4. Note that in this specification, the syngas discharging region is a region that includes a syngas flow path through which the syngas discharged from the gasification furnace 30 is delivered to the liquid fuel producer 4. Specifically, the syngas discharging region is a region that includes: a syngas flow path that connects the gasification furnace 30, and the scrubber 35; a syngas flow path that connects the inside of the scrubber 35, and this scrubber 35 and the desulfurizer 36; and a syngas flow path that connects the inside of the desulfurizer 36, and this desulfurizer 36 and the liquid fuel producer 4. In this embodiment, the hydrogen and carbon monoxide produced by the dry-reformer 75 are introduced into the syngas flow path that connects the gasification furnace 30, and the scrubber 35. Accordingly, the total amount of the syngas can be increased. Note that the dry-reformer 75 is controlled by the controller 10 to produce hydrogen and carbon monoxide by dry reforming from methane supplied from the $CH_4$ tank 72 if a predetermined condition described later is satisfied.

[Chem. 3]

$$CH_4 + CO_2 \rightleftharpoons 2CO + 2H_2 \quad (3)$$

The carbon dioxide using processor 8 includes a $CO_2$ recoverer 81, a $CO_2$ tank 82, a $CO_2$ amount detector 83, a $CO_2$ converter 84, and a fuel synthesizer 85.

The $CO_2$ recoverer 81 recovers carbon dioxide generated when the syngas is produced in the gasification furnace 30, and also recovers carbon dioxide that has not been synthesized into a fuel by the fuel synthesizer 85, and carbon dioxide recovered by the $CH_4$ recoverer 71. The carbon dioxide recovered by the $CO_2$ recoverer 81 is supplied to the $CO_2$ tank 82.

The $CO_2$ tank 82 stores the carbon dioxide recovered by the $CO_2$ recoverer 81. The carbon dioxide stored in the $CO_2$ tank 82 is supplied to the $CO_2$ converter 84, depending on the situation, as described later. The $CO_2$ amount detector 83 detects the amount of carbon dioxide stored in the $CO_2$ tank 82. The $CO_2$ amount detector 83 may be, for example, a pressure sensor that detects the internal pressure in the $CO_2$ tank 82. The $CO_2$ amount detector 83 detects the internal pressure in the $CO_2$ tank 82, and transmits the detection signal to the controller 10. The amount of carbon dioxide in the $CO_2$ tank 82 is calculated by the controller 10, based on the detection signal of the $CO_2$ amount detector 83.

The $CO_2$ converter 84 converts the carbon dioxide recovered by the $CO_2$ recoverer 81 into carbon monoxide. The $CO_2$ converter 84 produces carbon monoxide using, as feedstock, the carbon dioxide recovered by the $CO_2$ recoverer 81, and the hydrogen produced by the electrolyzer 60. The carbon monoxide converted by the $CO_2$ converter 84 is supplied as feedstock of a liquid fuel, together with the hydrogen produced by electrolyzer 60 and supplied by the hydrogen supply pump 64, to the gasifier 3. Carbon dioxide that has not been converted into carbon monoxide by the $CO_2$ converter 84 is supplied to the fuel synthesizer 85. Note that the $CO_2$ converter 84, and the hydrogen supply pump 64 are controlled by the controller 100 to produce carbon monoxide using carbon dioxide supplied from the $CO_2$ tank 82, and hydrogen supplied from the $H_2$ tank 62, as feedstock.

The fuel synthesizer 85 synthesizes a fuel to be used for the gasification furnace 30 using carbon dioxide that has been recovered by the $CO_2$ recoverer 81 but has not been converted into carbon monoxide by the $CO_2$ converter 84, and hydrogen produced by the electrolyzer 60, as feedstock. When the carbon dioxide, hydrogen and the like are introduced into the fuel synthesizer 85 by the $CO_2$ converter 84 and electrolyzer 60 described above, a catalytic reaction as indicated by, for example, the following formula (3) proceeds, and a fuel that contains methane and water is synthesized in the fuel synthesizer 85. The fuel synthesized by the fuel synthesizer 85 is supplied to the gasification furnace 30. Carbon dioxide that has not been used for synthesis by the fuel synthesizer 85 is supplied to the $CO_2$ recoverer 81.

The controller 10 is a computer that controls the water supply rate by the water supplier 32, the oxygen supply rate by the oxygen supplier 33, the input heat rate by the heater 34, and driving of the hydrogen producer and supplier 6, based on detection signals from the temperature sensor 31, the gas detector 37 and the like. The controller 10 controls the hydrogen supply pump 64, the methane using processor 7, the carbon dioxide using processor 8 and the like to execute the methane using process, and the carbon dioxide using process, based on the detection signals from the various sensors, such as the temperature sensor 31 and the gas detector 37, and the $H_2$ amount detector 63, the $CH_4$ amount detector 73, the $CO_2$ amount detector 83 and the like. The methane using process, and the carbon dioxide using process by the controller 10 are described later.

Figure 3:
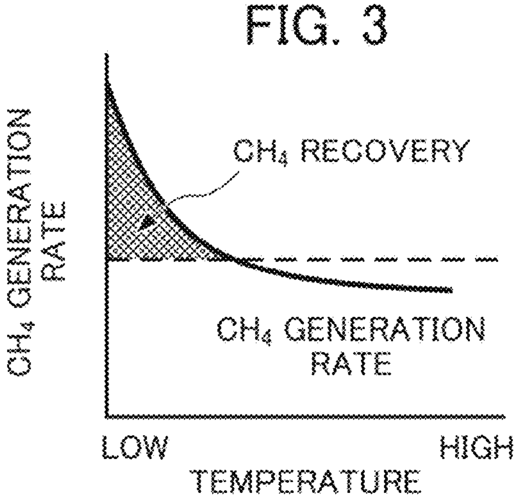
FIG. 3 shows the relationship between the temperature in a gasification furnace, and the methane generation rate during gasification of biomass feedstock.

Here, the methane generation rate in the gasification furnace 30 is described with reference to FIG. 3. FIG. 3 shows the relationship between the temperature in the gasification furnace 30, and the methane generation rate during gasification of biomass feedstock. The horizontal axis indicates the temperature in the gasification furnace 30. The vertical axis indicates the methane generation rate in the gasification furnace 30. As shown in FIG. 3, the higher the temperature in the gasification furnace 30 is, the lower the methane generation rate is. The lower the temperature in the gasification furnace 30 is, the higher the methane generation rate is. For example, if the temperature decreases when the gasifier 3 is stopped, or if the syngas flows near the outlet of the reaction tube of the gasification furnace 30, and the temperature of the syngas decreases, the $CH_4$ generation rate possibly increases. The fuel production system 1 according to this embodiment can effectively utilize methane generated as a byproduct during gasification of the biomass feedstock in fuel production.

Next, the configuration of hardware of the controller 10 that executes the methane using process, and the carbon dioxide using process is described. As shown in FIG. 2, the controller 10 includes a communicator (not shown), a storage 13, and a processor 11.

The communicator controls communication performed with other components, such as the temperature sensor 31, the gas detector 37, the water supplier 32, the oxygen supplier 33, the heater 34, the electrolyzer 60, the hydrogen supply pump 64, the methane using processor 7, and the carbon dioxide using processor 8. The communicator transmits and receives detection signals and control signals to and from these components.

The storage 13 is a storage region for various programs, various data and the like for causing hardware components to function as the controller 10, and may be made up of a ROM, a RAM, a flash memory, a semiconductor drive (SSD), hardware (HDD) or the like. Specifically, the storage 13 stores: a program for causing the processor 11 to execute each function in this embodiment; a control program for the methane using process, and the carbon dioxide using process; the target value of the $H_2$/CO ratio suitable to the type of the liquid fuel to be produced, and a producer therefor; the temperature in the gasification furnace 30 required to gasify the biomass feedstock; data, such as tables and expressions that indicate the relationships between the amount of heat applied to the gasification furnace 30, and the temperature in the gasification furnace 30 increased by the amount of heat applied to the gasification furnace 30 (hereinafter, called relationship data between the amount of heat and the increase in temperature in the gasification furnace 30); and a first threshold, a second threshold, a third threshold, a first upper threshold, a second upper threshold, a third upper threshold and the like, which are described later. Note that the temperature in the gasification furnace 30 required to gasify the biomass feedstock, and the relationship data between the amount of heat to be applied, and the increase in temperature in the gasification furnace 30 may be appropriately changed by a user, depending on the type of the biomass feedstock, the supply rate, the size of the gasification furnace 30 and the like.

The processor 11 is a computational device made up of a processor, reads various programs and data from the storage 13, and executes predetermined data processing. For example, the processor may be a CPU (central processing unit), an MPU (micro processing unit), an SoC (system on a chip), a DSP (digital signal processor), a GPU (graphics processing unit), a VPU (vision processing unit), an ASIC (application specific integrated circuit), a PLD (programmable logic device), an FPGA (field-programmable gate array) or the like.

Next, the functional configuration of the processor 11 of the controller 10 for executing the methane using process, and the carbon dioxide using process in the fuel production system 1 is described with reference to FIGS. 1 and 2.

As shown in FIG. 2, the processor 11 includes a $CH_4$ storage amount determiner 111, a $CO_2$ storage amount determiner 112, an $H_2$ storage amount determiner 113, a $CH_4$ generation rate determiner 114, an $H_2$ production rate determiner 115, a heat amount determiner 116, a heating controller 117, a steam reforming controller 118, a dry-reforming controller 119, and a $CO_2$ use controller 120.

The $CH_4$ storage amount determiner 111 determines whether or not the amount of methane stored in the $CH_4$ tank 72 is equal to or greater than a predetermined threshold (hereinafter, a first upper threshold). Specifically, the $CH_4$ storage amount determiner 111 obtains a detection result by the $CH_4$ storage amount detector 73 through the communicator, and determines the amount of methane stored in the $CH_4$ tank 72, based on the obtained detection result. The $CH_4$ storage amount determiner 111 reads the first upper threshold that indicates the capacity of the $CH_4$ tank 72, from the storage 12. The $CH_4$ storage amount determiner 111 then determines whether or not the amount of methane stored in the $CH_4$ tank 72 is equal to or greater than the first upper threshold.

The $CO_2$ storage amount determiner 112 determines whether or not the amount of carbon dioxide stored in the $CO_2$ tank 82 is equal to or greater than a predetermined threshold (hereinafter, a second upper threshold). Specifically, the $CO_2$ storage amount determiner 112 obtains the detection result of the $CO_2$ amount detector 83 through the communicator, and executes a process of determining the amount of carbon dioxide stored in the $CO_2$ tank 82 based on the obtained detection result. The $CO_2$ storage amount determiner 112 then determines whether or not the amount of carbon dioxide stored in the $CO_2$ tank 82 is equal to or greater than the second upper threshold.

The $H_2$ storage amount determiner 113 determines whether or not the amount of hydrogen stored in the $H_2$ tank 62 is equal to or greater than a predetermined threshold (hereinafter, a third upper threshold). Specifically, the $H_2$ storage amount determiner 113 obtains the detection result of the $H_2$ amount detector 63 through the communicator, and executes a process of determining the amount of hydrogen stored in the $H_2$ tank 62, based on the obtained detection result. The $H_2$ storage amount determiner 113 then determines whether or not the amount of hydrogen stored in the $H_2$ tank 62 is equal to or greater than the third upper threshold. Note that the first upper threshold, the second upper threshold, and the third upper threshold in this embodiment indicate the storable capacities of the respective tanks.

The $CH_4$ generation rate determiner 114 determines whether or not the generation rate of methane generated as a byproduct in the gasification furnace 30 is equal to or greater than a predetermined threshold (hereinafter called a first threshold). Specifically, the $CH_4$ generation rate determiner 114 obtains information about the generation rate of methane detected by the gas detector 37 that detects information about the syngas around the outlet of the gasification furnace 30, and retrieves the first threshold from the storage 12. The $CH_4$ generation rate determiner 114 then compares the generation rate of methane detected by the gas detector 37 with the first threshold, and determines whether or not the generation rate of methane during gasification of the biomass feedstock is equal to or greater than the first threshold.

The $H_2$ production rate determiner 115 determines whether or not the production rate of hydrogen produced by the electrolyzer 60 is equal to or greater than a predetermined threshold (hereinafter called a second threshold). Specifically, the $H_2$ production rate determiner 115 obtains information about the hydrogen production rate from the electrolyzer 60, and retrieves the second threshold from the storage 12. The $H_2$ production rate determiner 115 then compares the obtained hydrogen production rate of the electrolyzer 60 with the second threshold, and determines whether or not the hydrogen production rate is equal to or greater than the predetermined threshold.

The heat amount determiner 116 determines whether or not the amount of heat required to increase the temperature in the gasification furnace 30 to a temperature required to gasify the biomass feedstock (hereinafter called a gasification temperature) is less than a predetermined threshold (hereinafter called a third threshold). For example, the heat amount determiner 116 may calculate the difference between the temperature in the gasification furnace 30 obtained from the temperature sensor 31 and the gasification temperature, refer to the relationship data between the amount of heat and the increase in temperature of the gasification furnace 30, and calculate the amount of heat required to increase the temperature in the gasification furnace 30 to the gasification temperature. As the calculated amount of heat required to increase the temperature to the gasification temperature is smaller, it means that the temperature in the gasification furnace 30 more closely approaches the gasification temperature. As the required amount of heat is larger, it means that the temperature in the gasification furnace 30 is more apart from the gasification temperature, and is low. The heat amount determiner 116 may then compare the calculated amount of heat required to increase the temperature to the gasification temperature with the third threshold, and determine whether or not the amount of heat required to increase the temperature in the gasification furnace 30 to the gasification temperature is less than the third threshold.

Figure 4:
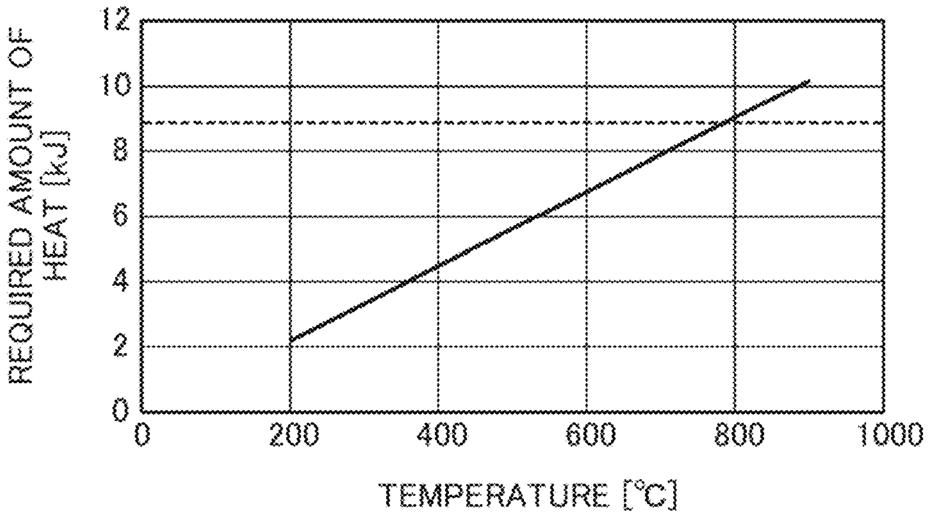
FIG. 4 shows the relationship between the temperature in the gasification furnace with a biomass feedstock supply rate of about 100 g/h, and an amount of heat required to increase the temperature in the gasification furnace 30 to each temperature.

FIG. 4 shows the relationship between the temperature in the gasification furnace 30 with a biomass feedstock supply rate of 100 g/h, and the amount of heat required to increase the temperature in the gasification furnace 30 to each temperature. The relationship shown in FIG. 4 is verified by a laboratory-level verification instrument. The horizontal axis indicates the temperature (° C.) in the gasification furnace 30. The vertical axis indicates the amount of heat (kJ) required to increase the temperature of the gasification furnace 30. In FIG. 4, a solid line indicates the relationship between the amount of heat applied to the gasification furnace 30, and the temperature in the gasification furnace 30 after the amount of heat is applied, and a broken line indicates the amount of heat required to increase the temperature in the gasification furnace 30 to 800° C. In FIG. 4, for example, in the gasification furnace 30 with the supply rate of the biomass feedstock of 100 g/h, the amount of heat required to increase the temperature in the gasification furnace 30 to 800° C. is about 9 kJ, according to the verification result by the laboratory-level verification instrument.

If it is determined by the heat amount determiner 116 that the amount of heat required to increase the temperature in the gasification furnace 30 to the gasification temperature is equal to or greater than the third threshold, the heating controller 117 controls the methane using processor 7 to execute a process of using methane recovered by the $CH_4$ recoverer 71 as a heat source for the gasification furnace. For example, the heating controller 117 may heat the outside of the reaction tube of the gasification furnace 30 using the high-temperature methane stored in the $CH_4$ tank 72. For example, the heating controller 117 may cause the high-temperature methane stored in the $CH_4$ tank 72 to flow to a fluidized bed of the gasification furnace 30, and increase the temperature in a flowing material in the fluidized bed, thus heating the gasification furnace 30. Accordingly, for example, if the amount of heat required for gasification is insufficient, methane can be used as the heat source for gasification. Consequently, the methane can be effectively utilized as the heat source, and generation of methane itself can be reduced.

For example, if all the following conditions (a) to (d) are satisfied, the steam reforming controller 118 controls the water supplier 32 and the steam reformer 74 to execute steam reforming of the methane recovered by the $CH_4$ recoverer 71 and stored in the $CH_4$ tank 72. The steam reforming controller 118 then carries out control that introduces the methane from the $CH_4$ tank 72 and water from the water supplier 32 into the steam reformer 74, performs steam reforming of the methane, and introduces the produced hydrogen and carbon monoxide into the gasification furnace 30.

(a) The $CH_4$ generation rate determiner 114 determines that the generation rate of methane is equal to or greater than the first threshold.

(b) The $CH_4$ storage amount determiner 111 determines that the amount of methane stored in the $CH_4$ tank 72 is less than the first upper threshold.

(c) The heat amount determiner 116 determines that the amount of heat required to increase the temperature in the gasification furnace 30 to the gasification temperature is less than the third threshold.

(d) The $H_2$ production rate determiner 115 determines that the production rate of hydrogen is less than the second threshold.

Figure 5:
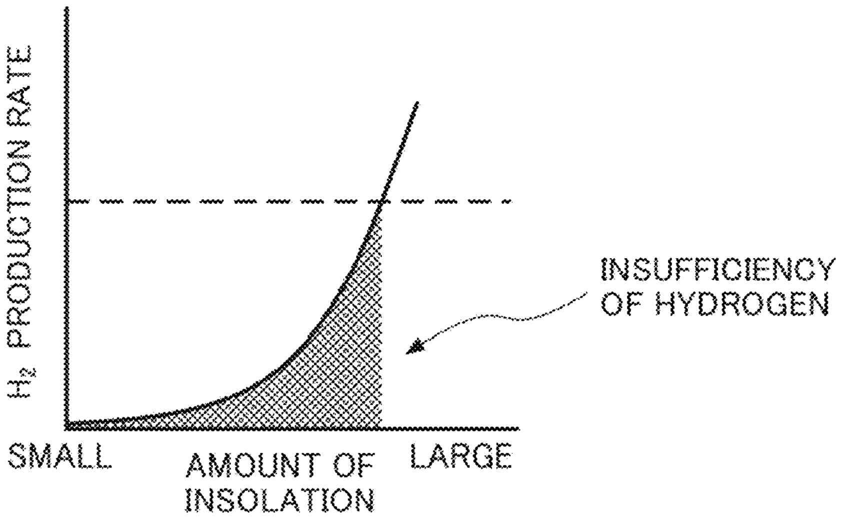
FIG. 5 shows the relationship between the amount of insolation and the hydrogen production rate in a case of producing hydrogen using electric power generated by a photovoltaic facility.

Here, the production rate of hydrogen produced using renewable energy, and the relationship between the rate of hydrogen introduced during gasification of the biomass feedstock and the generation rate of carbon dioxide are described with reference to FIGS. 5 to 7. FIG. 5 shows the relationship between the production rate of hydrogen produced by the electrolyzer 60 using the electric power generated by the power generation facility 5, which is the photovoltaic facility, and the amount of insolation. In general, the larger the amount of insolation is, the higher the rate of hydrogen that can be produced by the electrolyzer 60 is, and the smaller the amount of insolation is, the lower the rate of hydrogen that can be produced by the electrolyzer 60 is. That is, in case of poor weather, the hydrogen production rate by the electrolyzer 60 is possibly insufficient.

Figure 6:
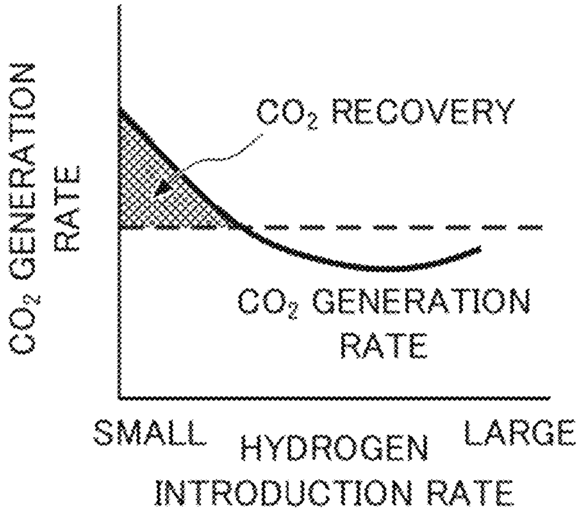
FIG. 6 shows the relationship between the hydrogen introduction rate into the gasification furnace, and the carbon dioxide generation rate in the gasification furnace.

FIG. 6 shows the relationship between the hydrogen introduction rate into the gasification furnace 30 (hereinafter called the hydrogen introduction rate), and the rate of carbon dioxide generated in the gasification furnace 30 (hereinafter called the carbon dioxide generation rate). The horizontal axis indicates the hydrogen introduction rate, and the vertical axis indicates the carbon dioxide generation rate. FIG. 7 shows the relationship between the hydrogen concentration in the gas introduced into the gasification furnace 30 in a case of gasifying the biomass feedstock in the gasification furnace 30 at 900° C., and the carbon dioxide concentration in the syngas produced in the gasification furnace 30. The relationship shown in FIG. 7 is obtained by a laboratory-scale test result. The vertical axis indicates the molar concentration of carbon dioxide in the syngas, and the horizontal axis indicates the hydrogen concentration in the gas to be introduced into the gasification furnace 30.

Figure 7:
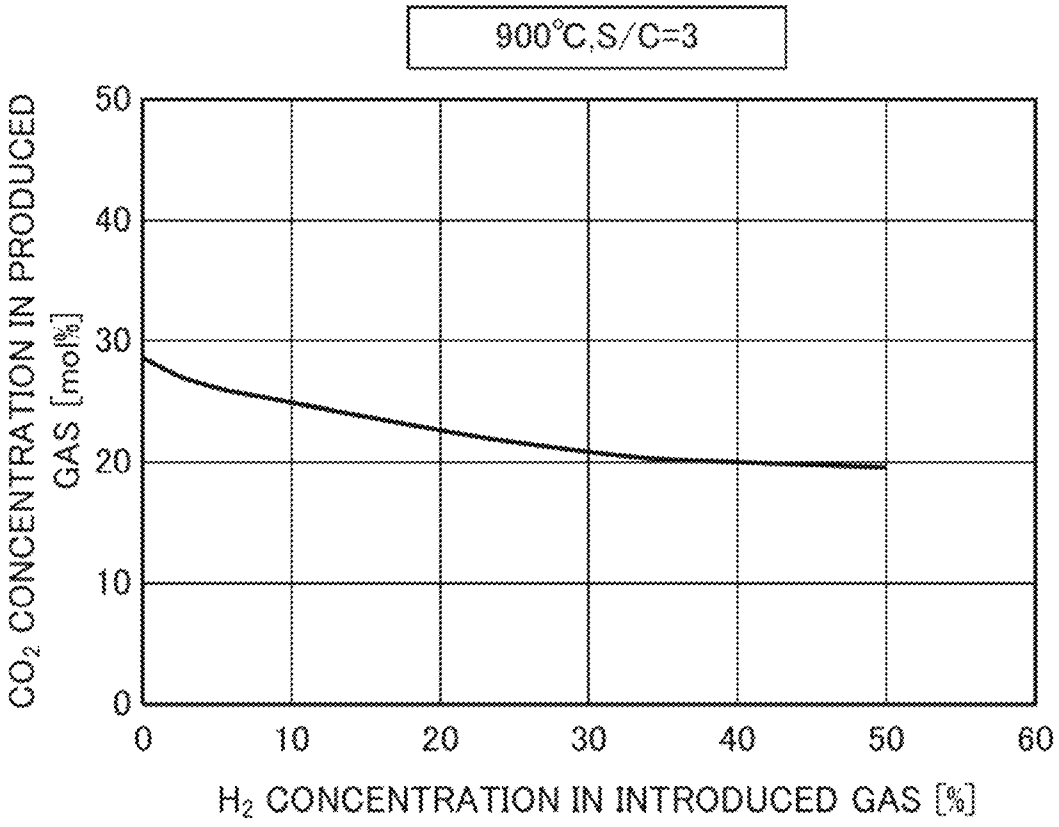
FIG. 7 shows the relationship between the hydrogen concentration in a gas introduced into the gasification furnace in a case of gasifying biomass feedstock in the gasification furnace at 900° C., and the carbon dioxide concentration in the syngas produced in the gasification furnace.

As shown in FIGS. 6 and 7, the lower the hydrogen introduction rate into the gasification furnace 30 is, the higher the carbon dioxide generation rate is, and the higher the hydrogen introduction rate is, the lower the carbon dioxide generation rate is. According to results shown in FIGS. 5 to 7, it can be confirmed that as the production rate of hydrogen produced using renewable energy decreases, and the hydrogen introduction rate into the gasification furnace 30 decreases, the carbon dioxide generation rate during gasification of the biomass feedstock increases.

According to the methane using process in this embodiment, when the hydrogen production rate decreases, hydrogen is produced by steam reforming of methane generated as a byproduct, and the produced hydrogen is introduced into the gasification furnace. Consequently, even when the production rate of hydrogen by renewable energy is insufficient owing to poor weather or the like, the gasification furnace 30 can be replenished with the hydrogen produced from methane that is a byproduct during gasification of the biomass feedstock. Consequently, the carbon dioxide generation rate during gasification of the biomass feedstock can be reduced, and the methane discharge rate from the fuel production system 1 can be reduced.

For example, if all the conditions (a) to (c) described above and the following conditions (e) and (f) are satisfied, the dry-reforming controller 119 controls the dry-reformer 75 and the like to execute dry reforming of methane recovered by the $CH_4$ recoverer 71 and stored in the $CH_4$ tank 72. The dry-reforming controller 119 then carries out control that introduces, into the dry-reformer 75, the methane from the $CH_4$ tank 72 and the carbon dioxide from the $CO_2$ tank, performs dry reforming of the methane, and introduces the produced hydrogen and carbon monoxide into the syngas discharging region A.

(e) The $H_2$ production rate determiner 115 determines that the production rate of hydrogen is equal to or greater than the second threshold.

(f) The $CO_2$ storage amount determiner 112 determines that the amount of carbon dioxide stored in the $CO_2$ tank is equal to or greater than the second upper threshold.

For example, if all the conditions (a) to (c) and (e) described above and the following (g) and (h) are satisfied, the $CO_2$ use controller 120 controls driving of the $CO_2$ recoverer 81, the $CO_2$ converter 84, the fuel synthesizer 85, the hydrogen supply pump 64 and the like, and executes the carbon dioxide using process. Specifically, the $CO_2$ use controller 120 controls the $CO_2$ recoverer 81 to recover carbon dioxide from the gasification furnace 30, and supply it to the $CO_2$ converter 84. The $CO_2$ use controller 120 controls the $CO_2$ converter 84 and the hydrogen supply pump 64 to convert carbon dioxide into carbon monoxide, supply the carbon monoxide, together with hydrogen, to the gasification furnace 30, and supply the fuel synthesizer 85 with carbon dioxide that has not been converted. The $CO_2$ use controller 120 then controls the fuel synthesizer 85 and the hydrogen supply pump 64 to synthesize a fuel containing methane and water from the carbon dioxide and hydrogen, and introduce it into the gasification furnace 30.

(g) The $CO_2$ storage amount determiner 112 determines that the amount of carbon dioxide stored in the $CO_2$ tank 82 is less than the second upper threshold.

(h) The $H_2$ storage amount determiner 113 determines that the amount of hydrogen stored in the $H_2$ tank is equal to or greater than the third upper threshold.

According to the carbon dioxide using process in this embodiment, the fuel used to gasify the biomass feedstock can be produced from the carbon dioxide generated during gasification of the biomass feedstock, which can facilitate improvement in efficiency of fuel production.

Figure 8:
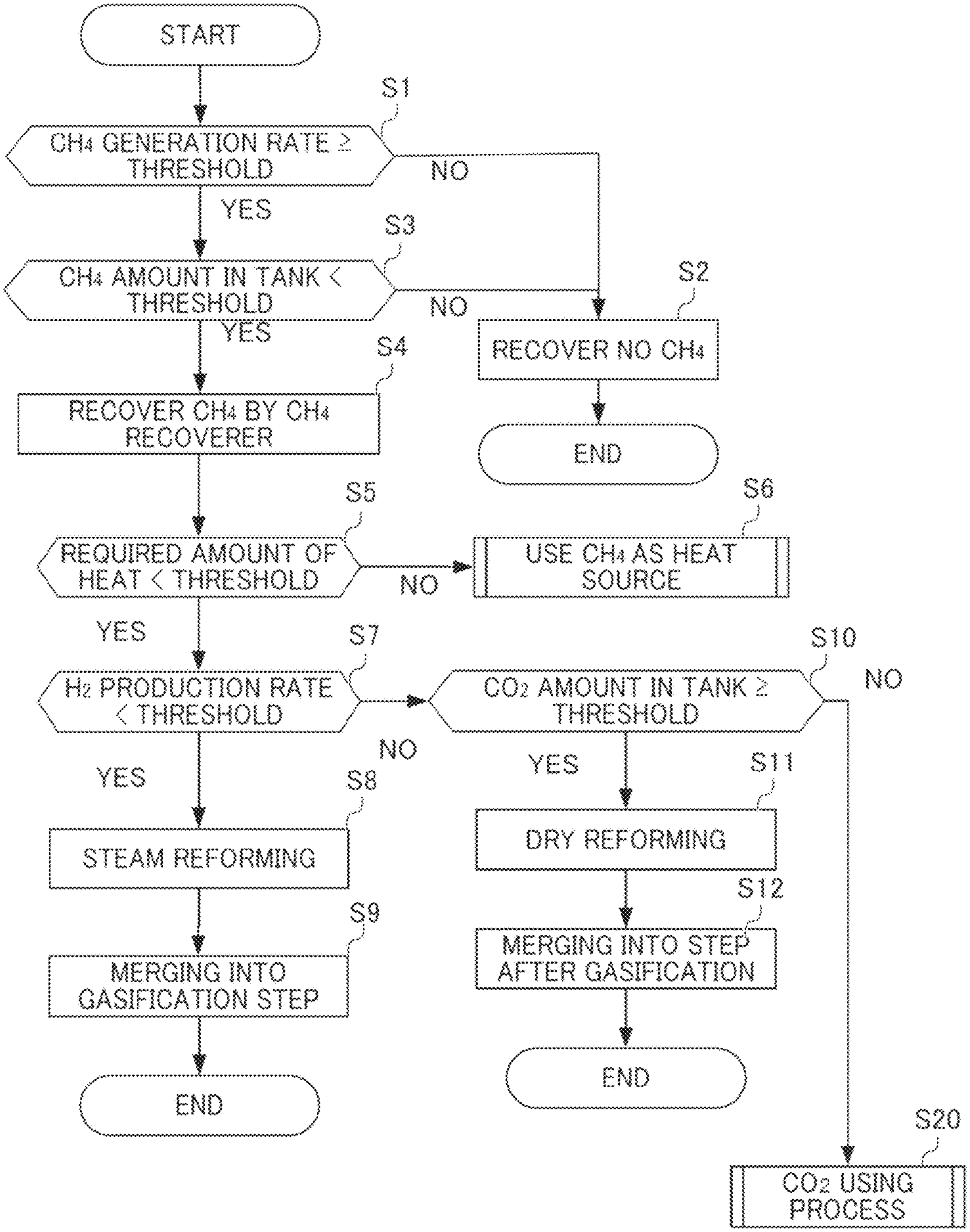
FIG. 8 is a flowchart showing an example of the flow of the methane using process executed by a controller of the fuel production system according to one embodiment of the present invention.
Figure 9:
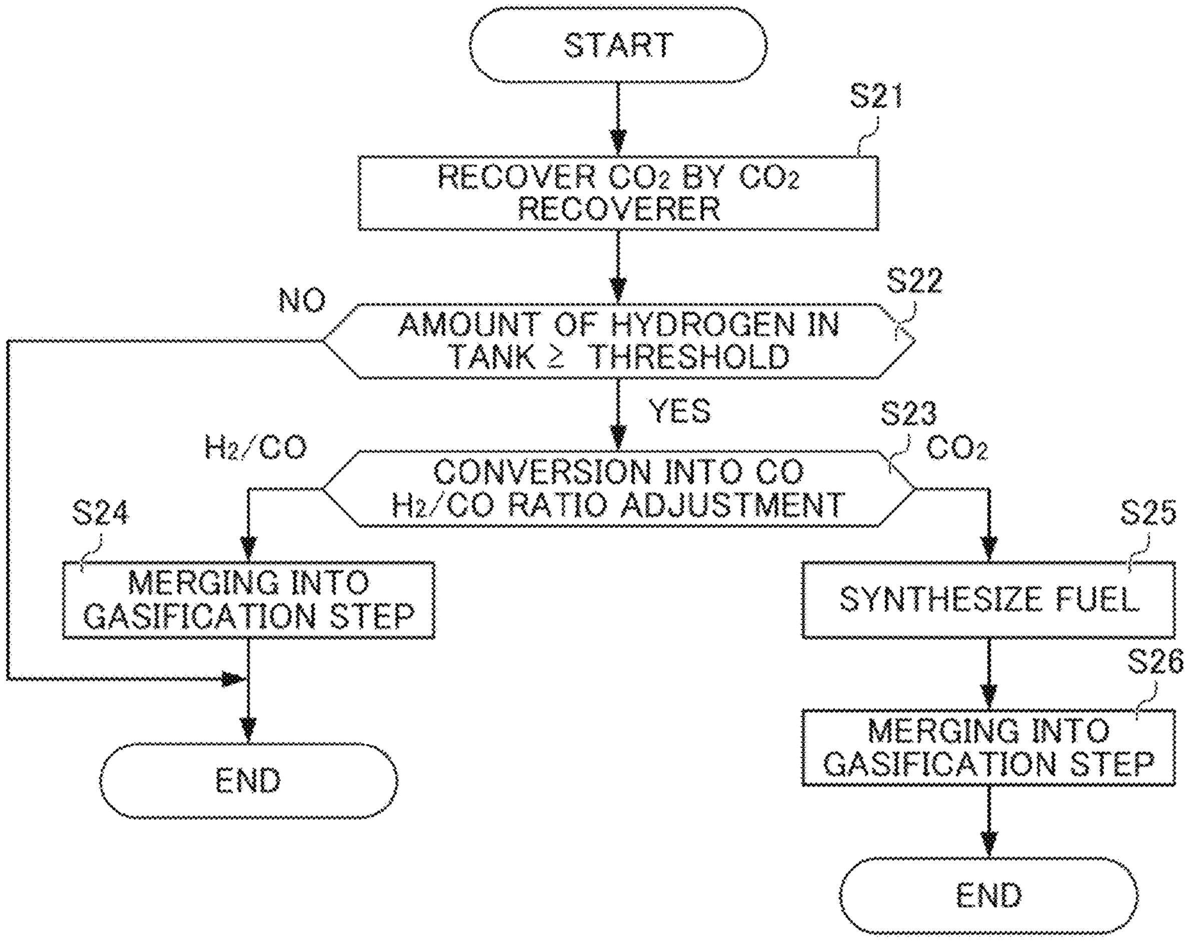
FIG. 9 is a flowchart showing an example of the flow of the carbon dioxide using process executed by the controller of the fuel production system according to one embodiment of the present invention.

Next, examples of the methane using process and the carbon dioxide using process executed by the processor 11 of the controller 10 are described with reference to FIGS. 8 and 9. FIG. 8 is a flowchart showing an example of the flow of the methane using process executed by the processor 11 of the controller 10 of the fuel production system 1. FIG. 9 is a flowchart showing an example of the flow of the carbon dioxide using process executed by the processor 11 of the controller 10 of the fuel production system 1.

As shown in FIG. 8, in Step S1 of the methane using process, the $CH_4$ generation rate determiner 114 determines whether or not the generation rate of methane generated as a byproduct in the gasification furnace 30 is equal to or greater than the first threshold. If it is determined by the $CH_4$ generation rate determiner 114 that the methane generation rate is less than the first threshold (NO in Step S1), the processor 11 does not perform control of recovering methane (Step S2). On the other hand, if it is determined by the $CH_4$ generation rate determiner 114 that the methane generation rate is equal to or greater than the first threshold (YES in Step S1), the processor 11 causes the processing to transition to Step S3.

In Step S3, the $CH_4$ storage amount determiner 111 determines whether or not the amount of methane stored in the $CH_4$ tank 72 is less than the first upper threshold. If it is determined by the $CH_4$ storage amount determiner 111 that the methane storage amount in the $CH_4$ tank 72 is equal to or greater than the first upper threshold (NO in Step S3), the processor 11 does not perform control of recovering methane (Step S2). On the other hand, if it is determined by the $CH_4$ storage amount determiner 111 that the methane storage amount in the $CH_4$ tank 72 is less than the first threshold (YES in Step S3), the processor 11 proceeds the processing to Step S4.

In Step S4, the steam reforming controller 118 controls the $CH_4$ recoverer 71 to recover methane generated as a byproduct in the gasification furnace 30.

In Step S5, the heat amount determiner 116 determines whether or not the amount of heat required to increase the temperature in the gasification furnace 30 to the gasification temperature (hereinafter called the required amount of heat) is less than the third threshold. If it is determined by the heat amount determiner 116 that the required amount of heat is equal to or greater than the third threshold (NO in Step S5), the heating controller 117 controls the methane using processor 7 to use the methane stored in the $CH_4$ tank 72 as the heat source for the gasification furnace 30. For example, the heating controller 117 may heat the outside of the reaction tube by allowing the high-temperature methane stored in the $CH_4$ tank 72 to flow into the gasification furnace 30. On the other hand, if it is determined by the heat amount determiner 116 that the required amount of heat for the gasification furnace 30 is less than the third threshold (YES in Step S5), the processor 11 causes the processing to transition to Step S7.

In Step S7, the $H_2$ production rate determiner 115 determines whether or not the production rate of hydrogen produced by the electrolyzer 60 is less than the second threshold. If it is determined by the $H_2$ production rate determiner 115 that the hydrogen production rate is less than the second threshold (YES in Step S7), the steam reforming controller 118 controls the water supplier 32 and the steam reformer 74 to perform steam reforming of methane stored in the $CH_4$ tank 72, and produce hydrogen and carbon monoxide (Step S8). Subsequently, the steam reforming controller 118 controls the steam reformer 74 to introduce the hydrogen and carbon monoxide produced in Step S8 into the gasification furnace 30 (Step S9), and finishes the methane using process. Note that methane that has not been converted into carbon monoxide by the steam reforming in Step S8 may be recovered by the $CH_4$ recoverer 71. On the other hand, if it is determined by the $H_2$ production rate determiner 115 that the hydrogen production rate is equal to or greater than the second threshold (NO in Step S7), the processor 11 causes the processing to transition to Step S10.

In Step S10, the $CO_2$ storage amount determiner 112 determines whether or not the amount of carbon dioxide stored in the $CO_2$ tank 82 is equal to or greater than the second upper threshold. If it is determined by the $CO_2$ storage amount determiner 112 that the amount of carbon dioxide stored in the $CO_2$ tank 82 is equal to or greater than the second upper threshold (YES in Step 10), the dry-reforming controller 119 controls the dry-reformer 75, the carbon dioxide using processor 8 and the like to perform dry reforming using the methane stored in the $CH_4$ tank 72 and the carbon dioxide stored in the $CO_2$ tank 82, and produces hydrogen and carbon monoxide (Step S11). The dry-reforming controller 119 then introduces the hydrogen and carbon monoxide produced in Step S11 into the syngas discharging region (Step S12), and finishes the methane using process. On the other hand, it is determined by the $CO_2$ storage amount determiner 112 that the amount of carbon dioxide is less than the second upper threshold (NO in Step S10), the processor 11 causes the processing to transition to the carbon dioxide using process in Step S20.

As shown in FIG. 9, in Step S21 the $CO_2$ use controller 120 controls the $CO_2$ recoverer 81 to recover carbon dioxide generated in the gasification furnace 30.

In Step S22, the $H_2$ storage amount determiner 113 determines whether or not the amount of hydrogen stored in the $H_2$ tank 62 is equal to or greater than the third upper threshold. If it is determined by the $H_2$ storage amount determiner 113 that the amount of hydrogen stored in the $H_2$ tank 62 is less than the third upper threshold (NO in Step 22), the processor 11 finishes the carbon dioxide using process. On the other hand, it is determined by the $H_2$ storage amount determiner 113 that the amount of hydrogen stored in the $H_2$ tank 62 is equal to or greater than the third upper threshold (YES in Step 22), the processor 11 causes the processing to transition to Step S23.

In Step S23, the $CO_2$ use controller 120 controls the $CO_2$ converter 84 and the hydrogen supply pump 64 to convert carbon dioxide into carbon monoxide, and adjust the $H_2/CO$ ratio of the converted carbon monoxide and the hydrogen produced by the electrolyzer 60 to a predetermined target ratio. The syngas with the adjusted $H_2/CO$ ratio is supplied to the syngas discharging region (Step S24). In Step S23, carbon dioxide that has not been converted into carbon monoxide is used in synthesis of a fuel by the fuel synthesizer 85 (Step S25). The fuel synthesized by the fuel synthesizer 85 is supplied to the gasification furnace 30 (Step S26), and the carbon dioxide using process is finished. Note that carbon dioxide that has not been used in synthesis by the fuel synthesizer 85 is recovered by the $CO_2$ recoverer 81.

The one embodiment has thus been described above. However, the present invention is not limited to this. The detailed configuration may be appropriately changed within a range of the spirit of the present invention.

Explanation of Reference Numerals

1 Fuel production system
4 Liquid fuel producer
30 Gasification furnace
71 $CH_4$ recoverer (methane recoverer)
60 Electrolyzer
74 Steam reformer
10 Controller
116 Heat amount determiner
115 Hydrogen production rate determiner ($H_2$ production rate determiner)
118 Steam reforming controller

What is claimed is:

1. A fuel production system for producing a liquid fuel from biomass feedstock, comprising:
- a gasification furnace configured to gasify biomass feedstock to produce a syngas comprising hydrogen and carbon monoxide;
- a methane recoverer configured to recover methane generated as a byproduct in the gasification furnace;
- an electrolyzer configured to produce hydrogen with electric power generated using renewable energy;
- a liquid fuel producer configured to produce a liquid fuel from the syngas produced in the gasification furnace;
- a steam reformer configured to perform steam reforming of the methane recovered by the methane recoverer to produce hydrogen; and
- a controller programmed to control the methane recoverer and the steam reformer,
- wherein the controller is further programmed to include:
- a heat amount determiner that determines whether or not an amount of heat required to increase a temperature in the gasification furnace to a temperature required to gasify the biomass feedstock is less than a predetermined threshold;
- a hydrogen production rate determiner that determines whether or not a production rate of hydrogen produced by the electrolyzer is equal to or greater than a predetermined threshold; and
- a steam reforming controller that controls the steam reformer to perform the steam reforming, and introduces the hydrogen produced, into the gasification furnace, in a case where the amount of heat required is less than the predetermined threshold, and the production rate of hydrogen is less than the predetermined threshold.

2. The fuel production system according to claim 1, further comprising:
- a carbon dioxide recoverer configured to recover carbon dioxide generated when the syngas is produced in the gasification furnace;
- a carbon dioxide tank configured to store the carbon dioxide recovered by the carbon dioxide recoverer; and
- a dry-reformer configured to perform dry reforming of the methane, and produce hydrogen and carbon monoxide, wherein the controller is further programmed to further include:

a carbon dioxide amount determiner that determines whether or not a storage amount of the carbon dioxide in the carbon dioxide tank is equal to or greater than a predetermined threshold; and a dry-reforming controller that controls the dry-reformer to perform the dry reforming, and introduces the hydrogen and carbon monoxide produced, toward the liquid fuel producer, into a syngas discharging region where the syngas is discharged from the gasification furnace in a case where the amount of heat required is less than the predetermined threshold, the production rate of hydrogen is equal to or greater than the predetermined threshold, and the storage amount of the carbon dioxide is equal to or greater than the predetermined threshold.

3. The fuel production system according to claim 1, wherein the controller is further programmed to further include a heating controller that uses the methane recovered by the methane recoverer as a heat source for the gasification furnace in a case where the amount of heat required is equal to or greater than the predetermined threshold.

4. The fuel production system according to claim 2, wherein the controller is further programmed to further include a heating controller that uses the methane recovered by the methane recoverer as a heat source for the gasification furnace in a case where the amount of heat required is equal to or greater than the predetermined threshold.

* * * * *